Figure 1:
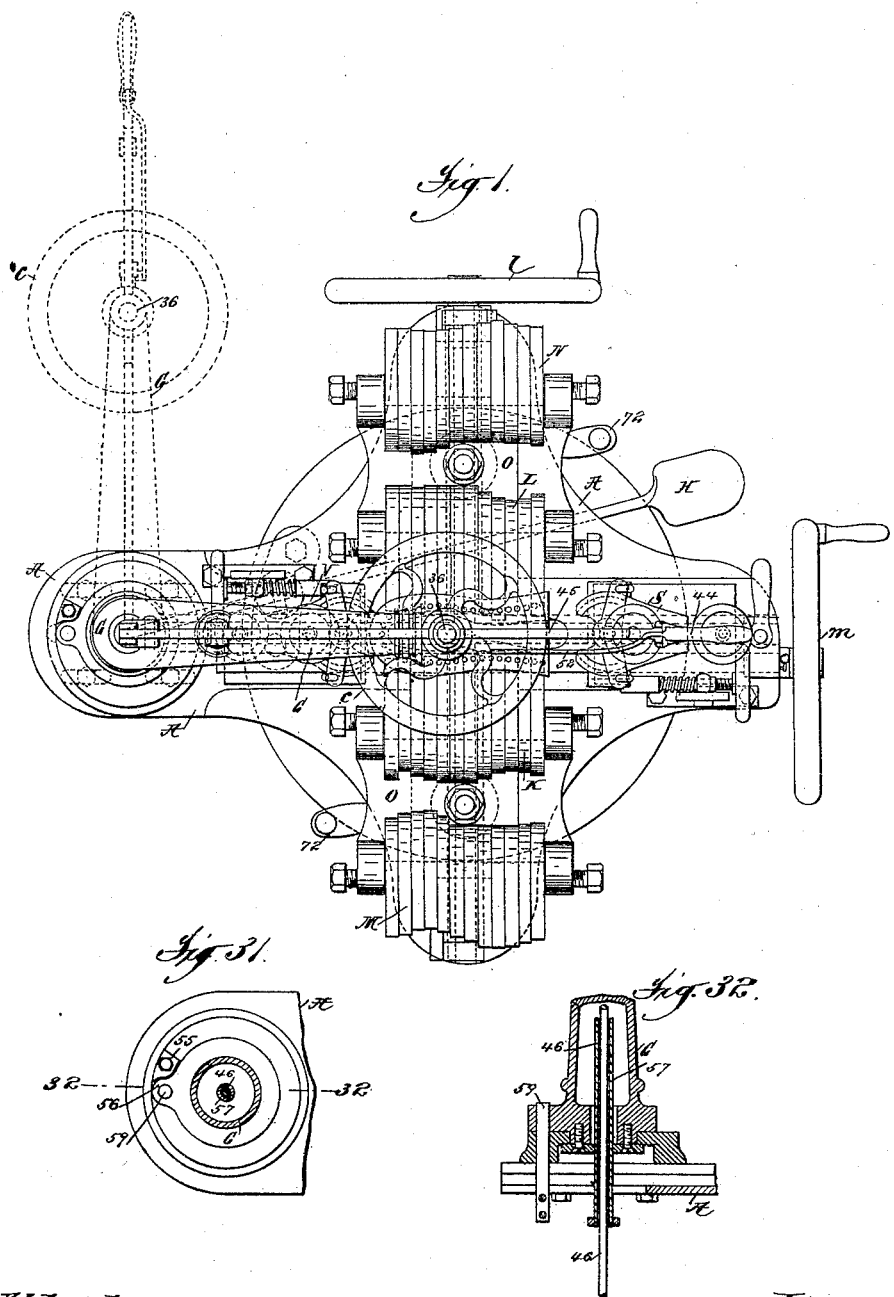

(No Model.) 12 Sheets—Sheet 1.

J. PATTEN.
LASTING MACHINE.

No. 452,879. Patented May 26, 1891.

(No Model.) 12 Sheets—Sheet 2.

J. PATTEN.
LASTING MACHINE.

No. 452,879. Patented May 26, 1891.

Attest
Geo. H. Botts.
J. J. Kennedy

Inventor
John Patten
By Philip Phelps & Henry
Attys (No Model.) 12 Sheets—Sheet 3.
J. PATTEN.
LASTING MACHINE.
No. 452,879. Patented May 26, 1891.
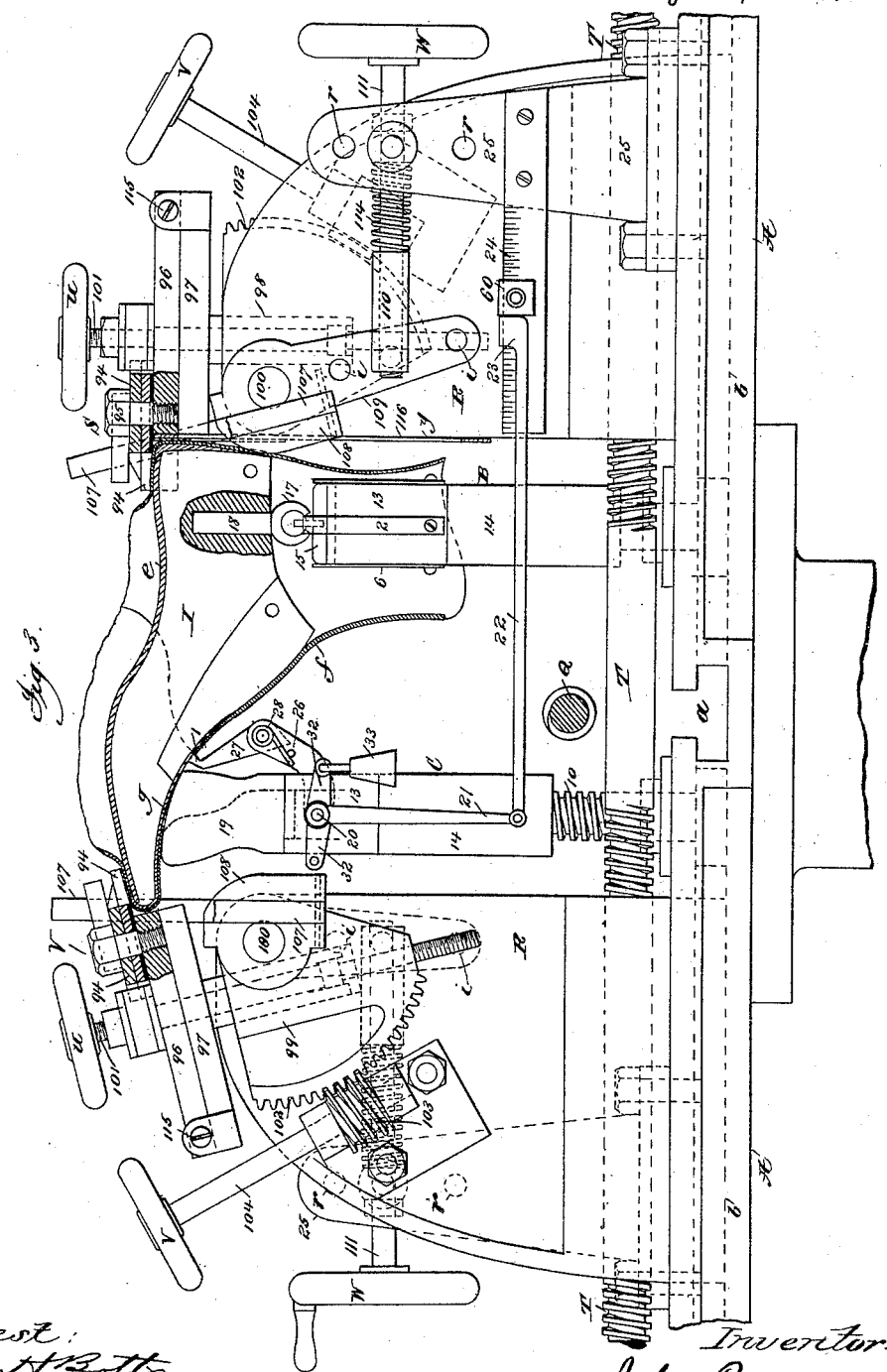
Attest:
Geo. H. Botts
J. J. Kennedy
Inventor:
John Patten
by Philipp, Philp & Avery
Attys (No Model.) 12 Sheets—Sheet 4.
J. PATTEN.
LASTING MACHINE.
No. 452,879. Patented May 26, 1891.
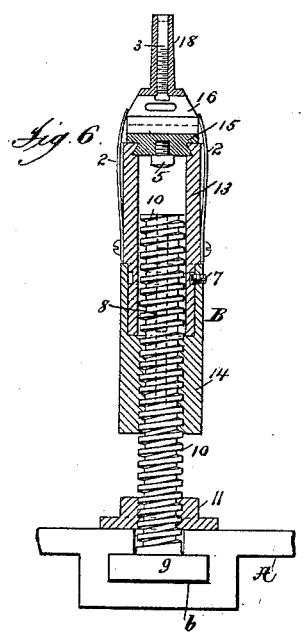
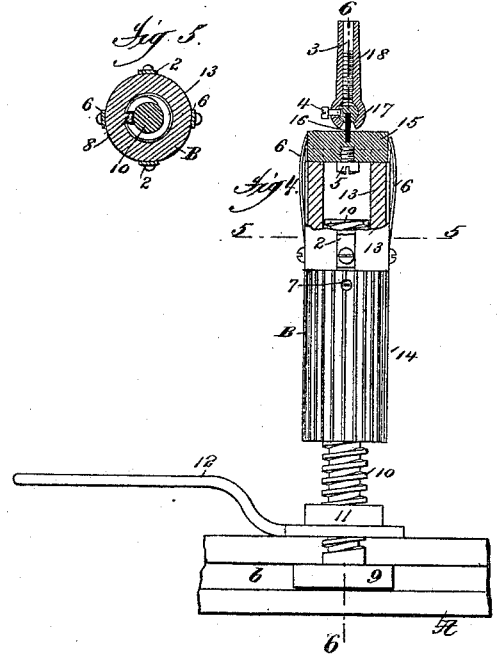
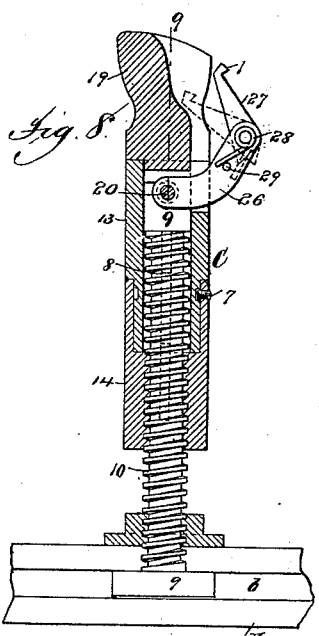
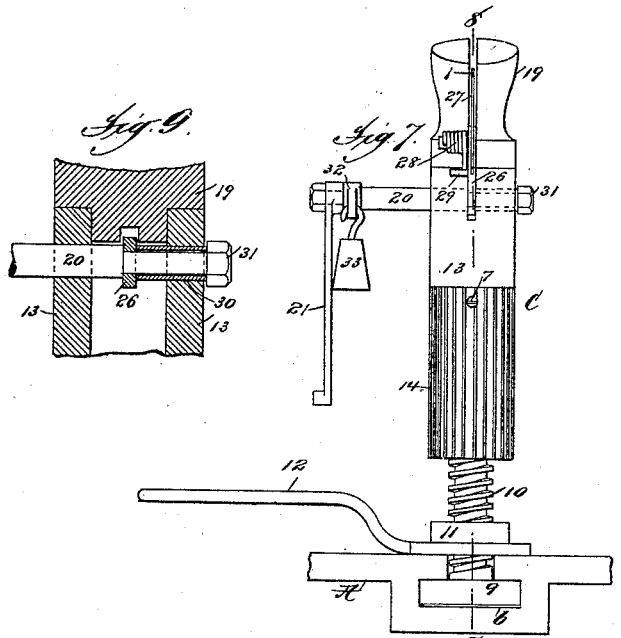
Attest:
Geo. H. Bott
J. J. Kennedy
Inventor
John Patten
by Philipp, Phelps & Hooey
Attys.

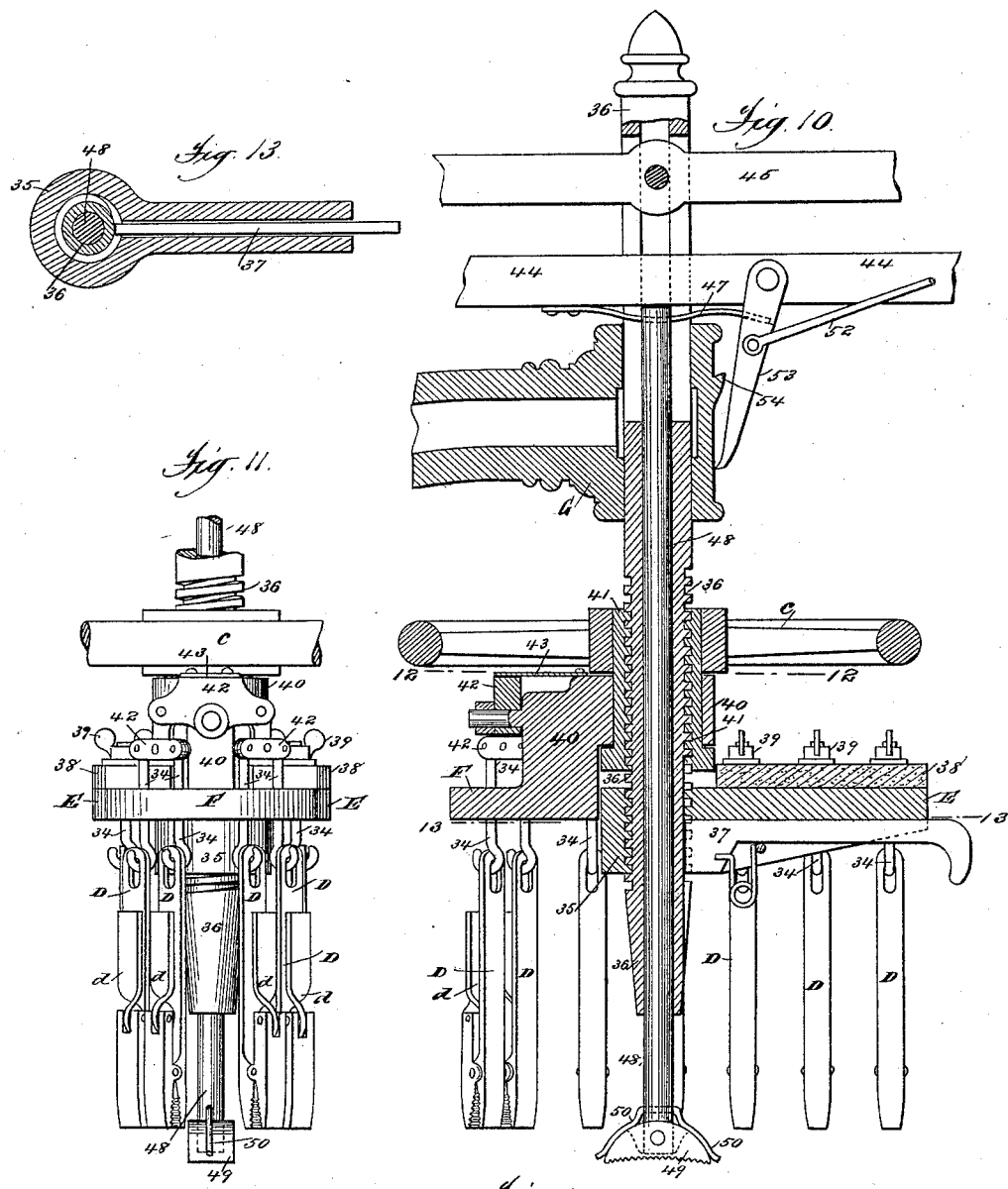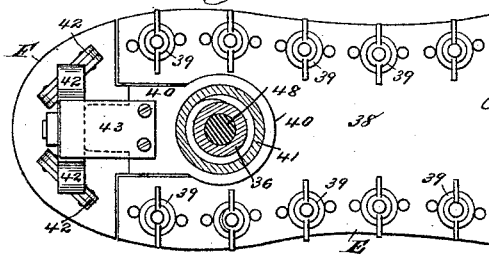

(No Model.)  12 Sheets—Sheet 6.

J. PATTEN.
LASTING MACHINE.

No. 452,879. Patented May 26, 1891.

Attest:
Geo. H Botts.
J. J. Kennedy

Inventor.
John Patten
by Philipp Philipp & Hony
Attys

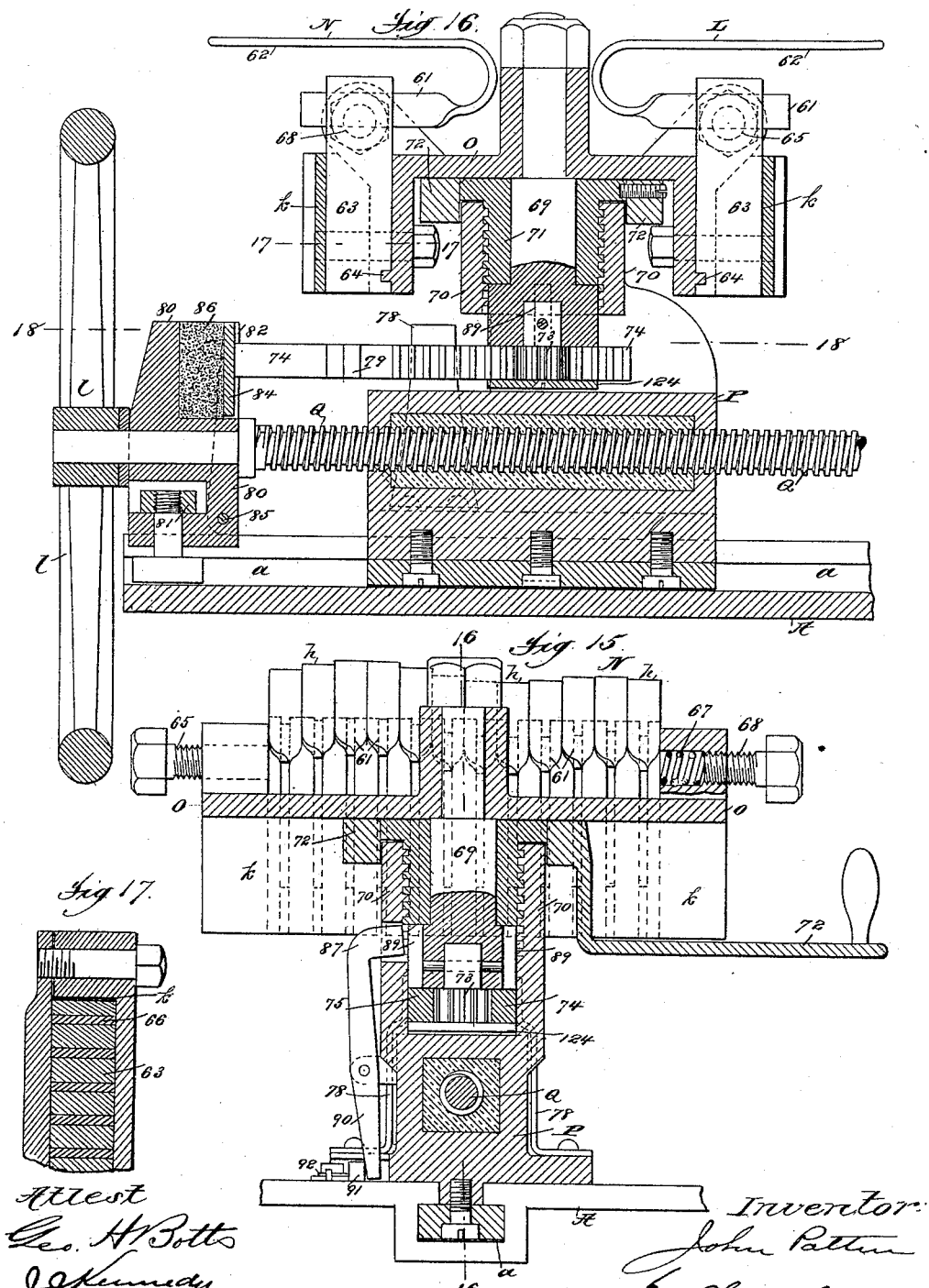

(No Model.) 12 Sheets—Sheet 8.

J. PATTEN.
LASTING MACHINE.

No. 452,879. Patented May 26, 1891.

Attest:
Geo. H. Botts
J. J. Kennedy

Inventor
John Patten
by Philipp Philipp Henry
Attys

THE NORRIS PETERS CO., PHOTO-LITHO., WASHINGTON, D. C.

(No Model.) 12 Sheets—Sheet 9.
J. PATTEN.
LASTING MACHINE.
No. 452,879. Patented May 26, 1891.
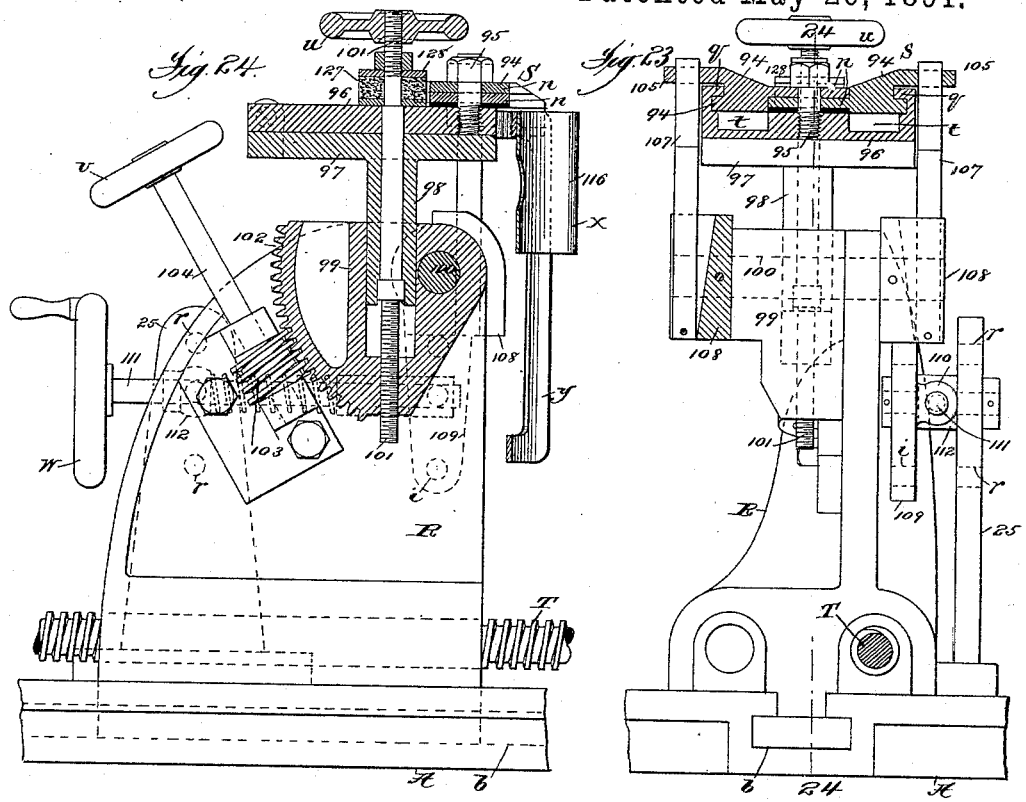
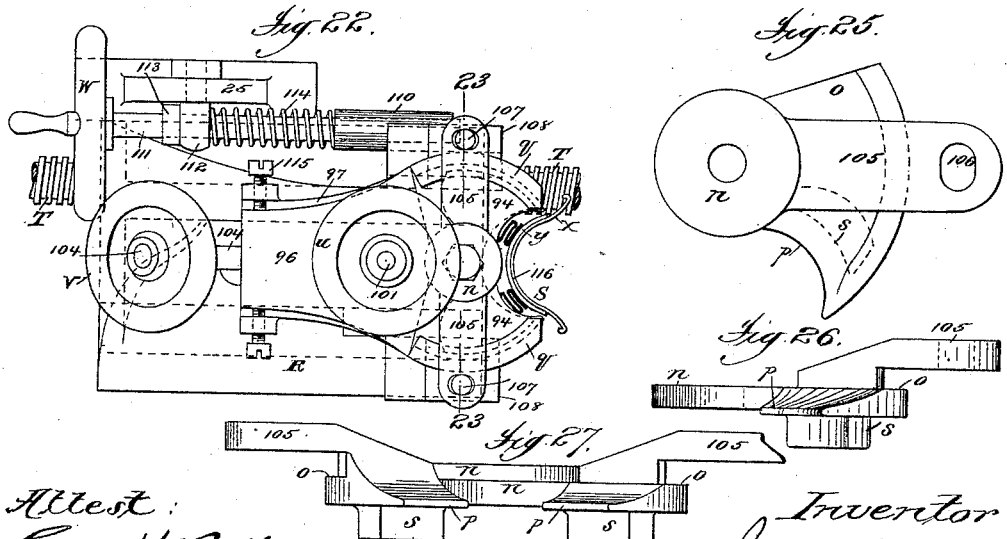
Attest:
Geo. H. Botts
J. J. Kennedy
Inventor
John Patten
by Philipp Philipp & Herey
Attys (No Model.) 12 Sheets—Sheet 10.
J. PATTEN.
LASTING MACHINE.
No. 452,879. Patented May 26, 1891.
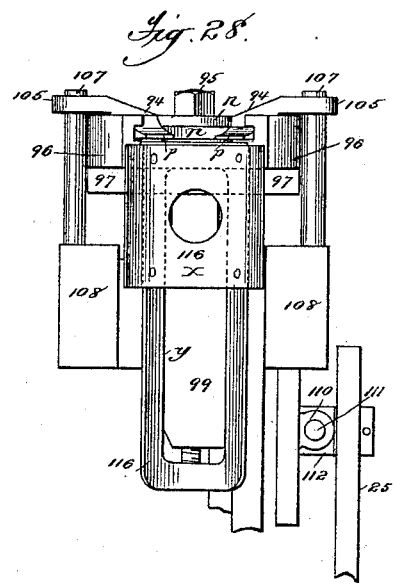
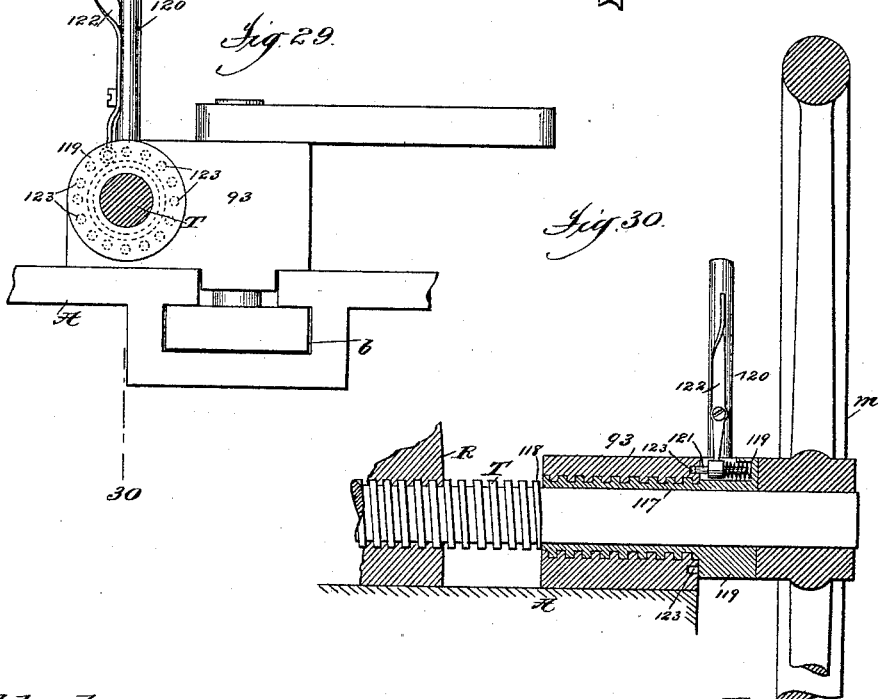
Attest:
Geo. H. Potts
J. J. Kennedy
Inventor:
John Patten
by Philipp, Philipp & Hoory
Attys (No Model.)  12 Sheets—Sheet 11.
J. PATTEN.
LASTING MACHINE.
No. 452,879. Patented May 26, 1891.
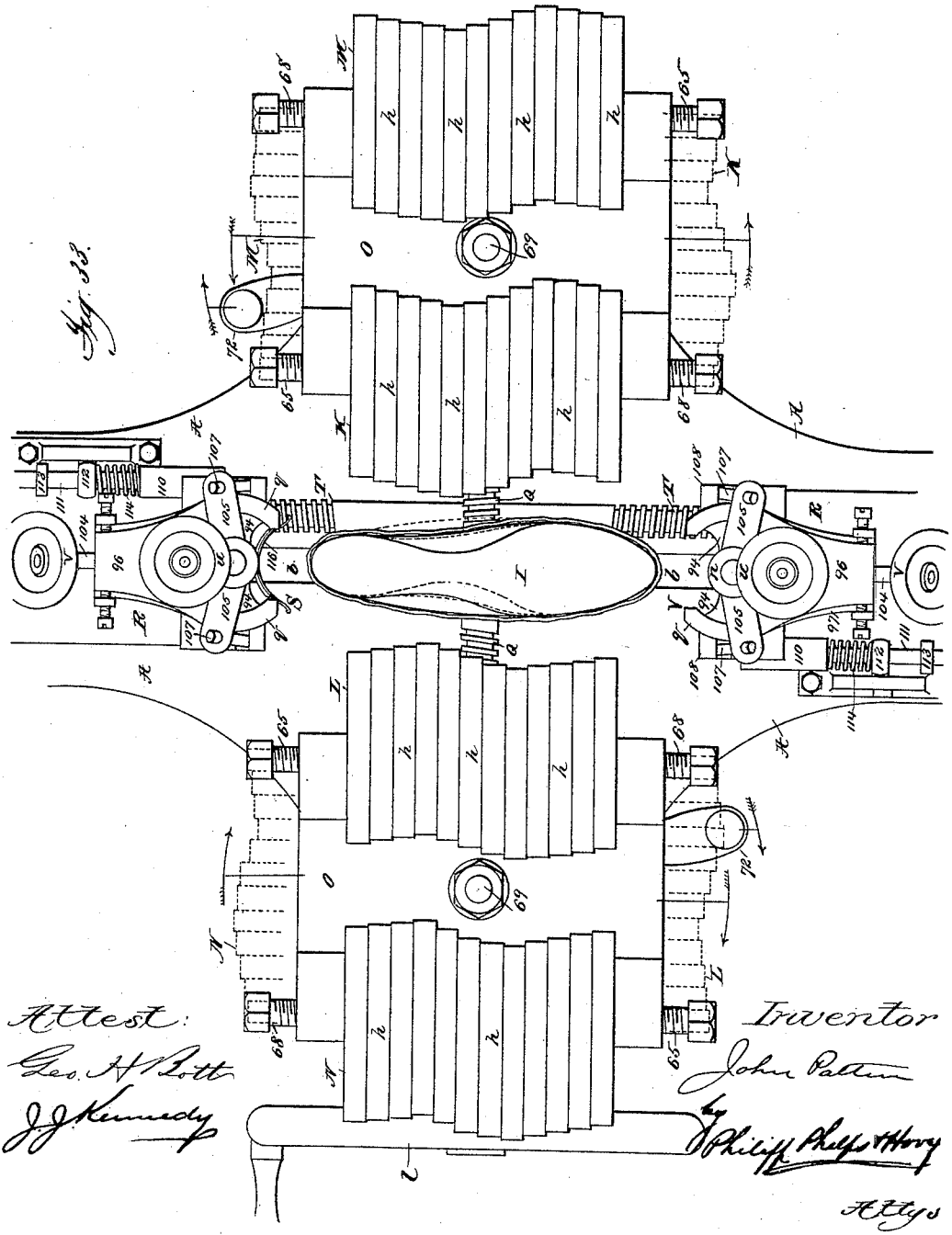

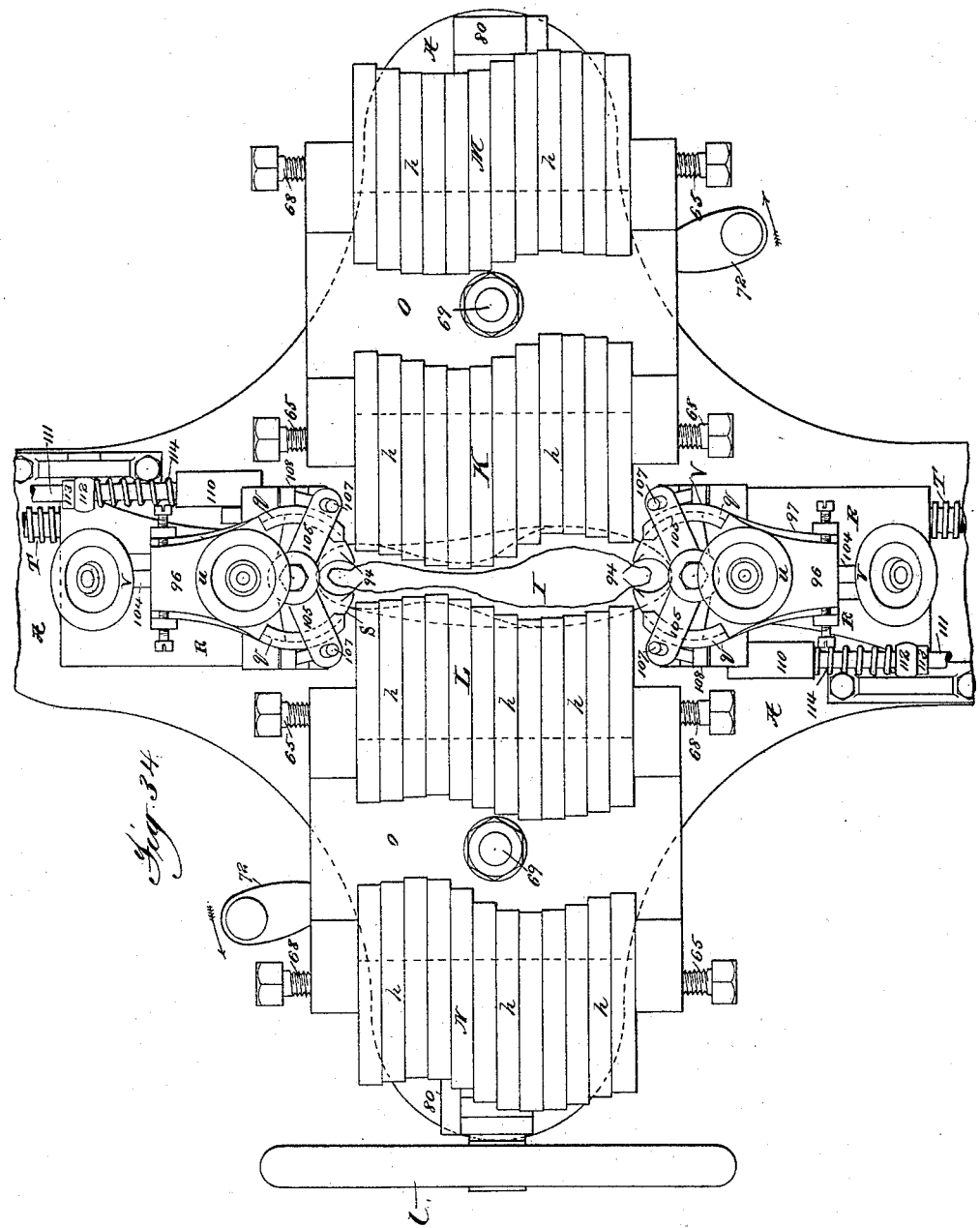

UNITED STATES PATENT OFFICE.

JOHN PATTEN, OF BALTIMORE, MARYLAND.

LASTING-MACHINE.

SPECIFICATION forming part of Letters Patent No. 452,879, dated May 26, 1891.

Application filed February 20, 1888. Serial No. 264,665. (No model.)

*To all whom it may concern:*

Be it known that I, JOHN PATTEN, a citizen of the United States, residing at Baltimore, in the State of Maryland, have invented certain new and useful Improvements in Lasting-Machines, fully described and represented in the following specification and the accompanying drawings, forming a part of the same.

This invention relates to an organized machine for lasting boots and shoes—that is to say, a machine which operates to stretch the material which forms the upper of the boot or shoe around the last and cause it to properly conform thereto to give the desired shape to the boot or shoe. Such a machine, in order to fulfill all the conditions which are desirable in practical operation, must be so organized that the several mechanisms which perform the different operations required can be readily adjusted to operate in connection not only with lasts which vary in size, but also in connection with lasts which vary almost indefinitely in shape or configuration. It must also be capable of operating alternately in connection with the last for the right and left foot and upon material of varying thickness and quality, and it must be so organized that the adjustments necessary for fulfilling these conditions can be performed easily and quickly and with absolute accuracy.

It is the object of the present invention to provide an organized lasting-machine which shall fulfill all of the foregoing conditions and which shall at the same time be simple in its construction, certain, reliable, and rapid in its operation, which will not be liable to get out of order, and in which the different mechanisms will to a great extent operate automatically.

To this end the invention consists in certain improvements in the various details and mechanisms of which the machine is made up and in various combinations of parts, all of which will be hereinafter fully described and particularly pointed out.

To aid in a more easy understanding of the detailed description which will be hereinafter given, a brief general description of the organization and operation of the machine will be first given.

The complete machine may be naturally divided into four mechanisms or sets of mechanisms, which perform functions which are to some extent independent of each other, although all of these mechanisms co-operate to form the complete machine. These mechanisms are the mechanism for supporting the last, the mechanism for stretching or conforming the material around the last, the mechanism for crimping or folding the material over at the sides of the last, and the mechanism for crimping or folding over the material at the heel and toe.

The mechanism for supporting the last consists of a heel-support and a toe-support, which are adjustable to conform to lasts of different length and thickness, and also adjustable to give the last any inclination relatively to the crimpers which the outline of the sole of the last may require.

The mechanism for stretching or conforming the material around the last consists, primarily, of a series of grippers arranged to grasp the edges of the upper and stretch it around the last under proper tension to cause it to conform thereto. These grippers are supported upon heads which are operated from a treadle through suitable connections to give the required movement to the grippers for the purpose of stretching the upper. These grippers are made independently adjustable and are so connected to the heads as to be capable of yielding slightly to secure an even tension upon the upper.

The mechanism for crimping the leather over at the sides of the last consists of two pairs of crimpers, (one pair for the right last and one pair for the left last,) which are supported upon revolving heads or carriers located upon the opposite sides of the last and mounted upon carriages which are arranged to be simultaneously advanced for the crimping operation and simultaneously retracted to permit of the introduction and removal of the last. The heads carrying the crimpers are provided with mechanism by which, as the carriages are retracted after the crimping operation, the heads are reversed, so that when again advanced the other pair of crimpers will be brought into position to perform the next crimping operation, thus permitting the machine to operate alternately upon the right and left lasts. Each of the crimpers is composed of a series of independently-adjustable side lasting or crimping fingers, the position of which can be varied indefinitely to conform to the outlines of the different lasts to be operated upon.

The mechanism for crimping or folding over the material at the heel and toe consists, primarily, of a heel-crimper and a toe-crimper, each of which is composed of a pair of gathering and crimping jaws which conform approximately to the contour of the heel and toe of the last and are caused to close at the proper time to gather the material over these portions of the last. These jaws are mounted upon adjustable head-plates supported upon carriages which are provided with mechanism by which they are simultaneously advanced and retracted to effect the crimping operation and to allow the last to be introduced and removed, the jaws being automatically closed as the carriages are advanced, and vice versa. The head-plates upon which the gathering and crimping jaws are mounted are provided with means by which they can be adjusted vertically and to different angles of inclination to bring the jaws into proper position to operate upon lasts of varying thicknesses and shapes, and the mechanism for automatically closing the jaws is capable of adjustment to cause the jaws to close sooner or later to conform to variations in the length of the last.

The details in the construction and operation of the mechanisms and the organization thus briefly outlined will now be fully described and explained in connection with the accompanying drawings, in which—

Figure 2:
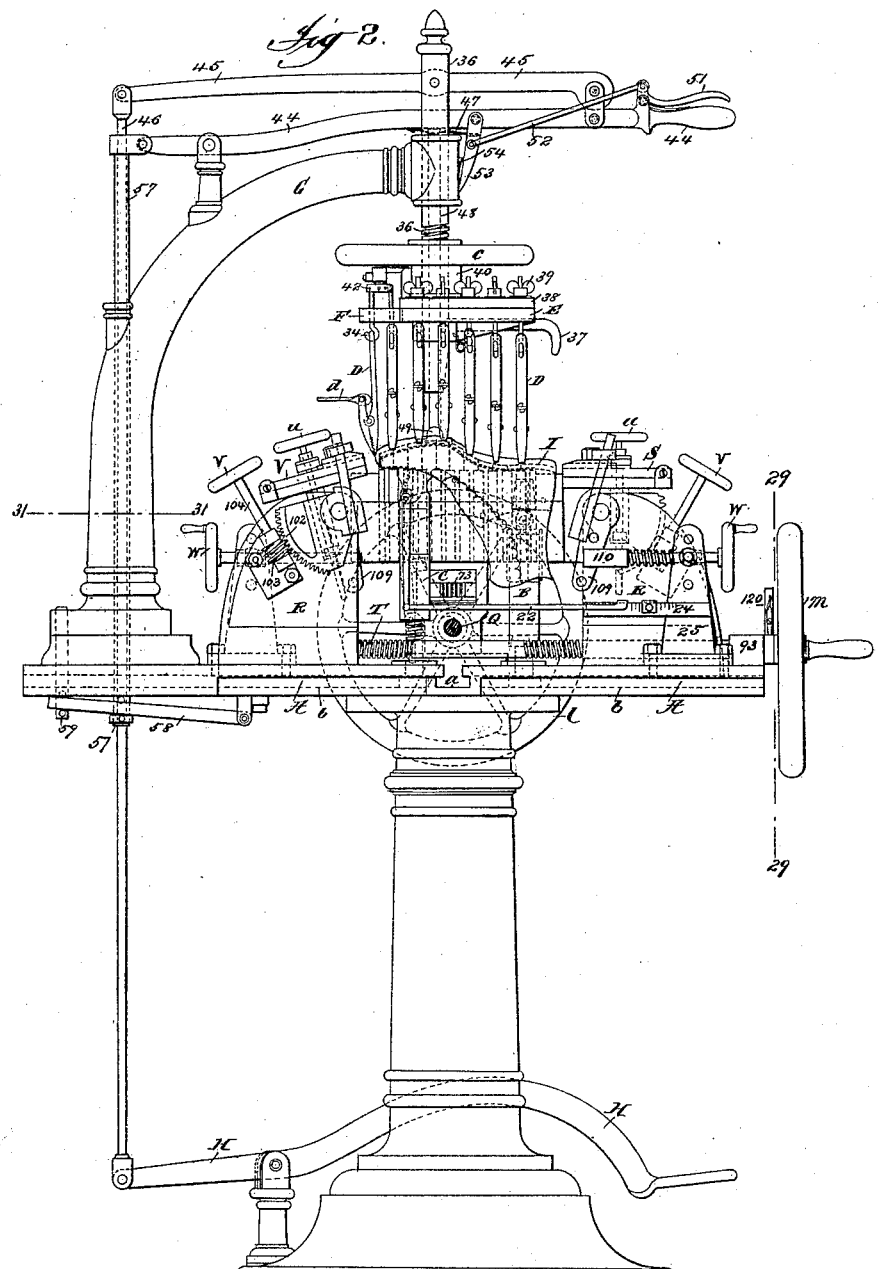
Figure 14:
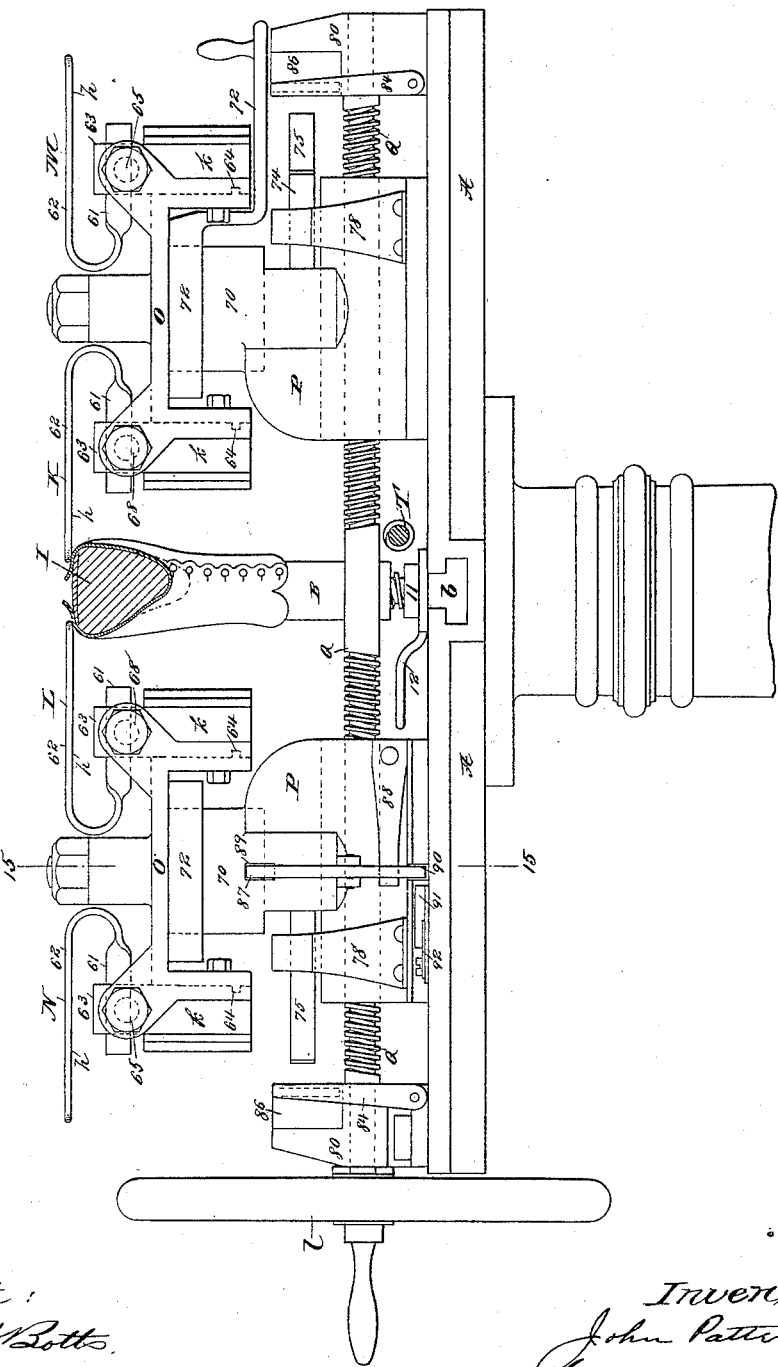
Figure 18:
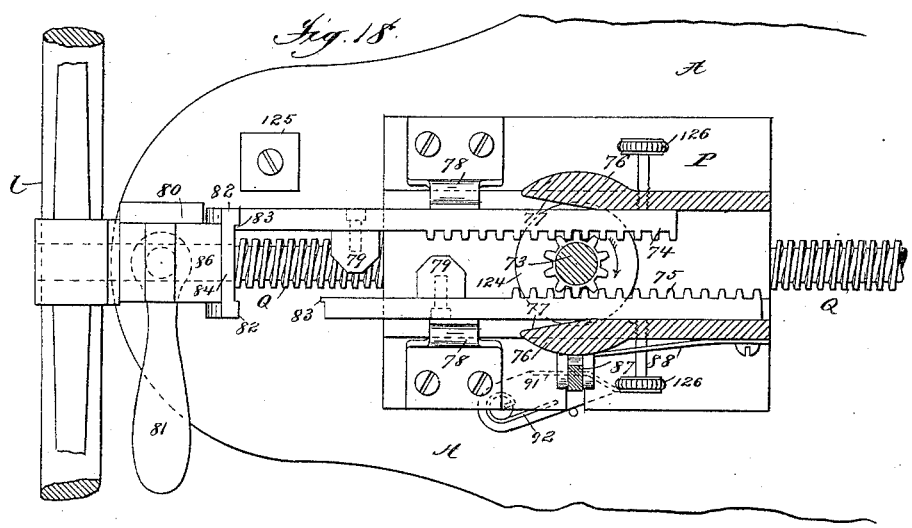
Figure 19:
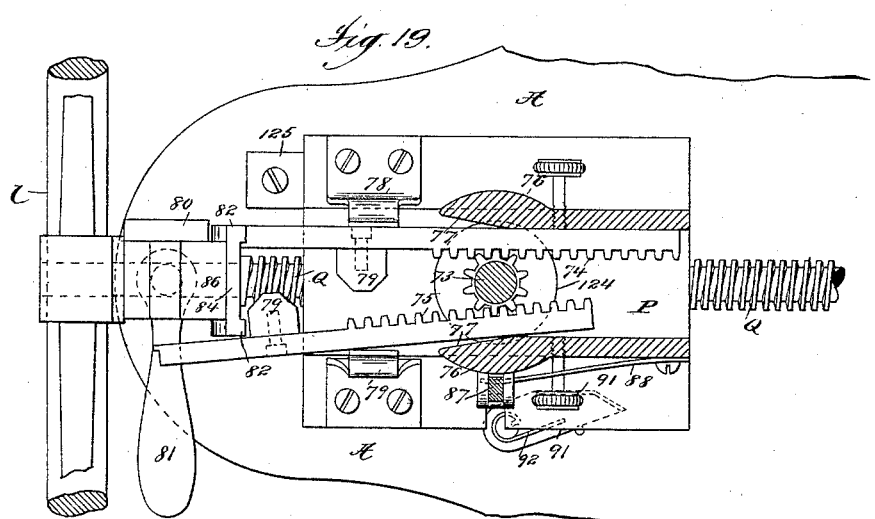
Figure 20:
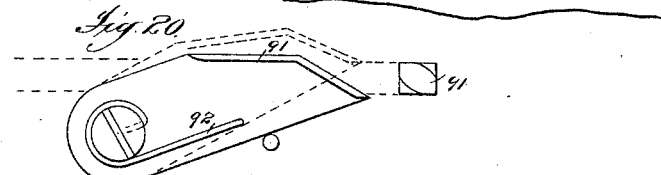
Figure 21:
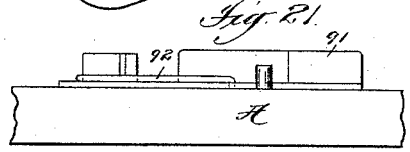

Figure 1 is a plan view of the complete machine. Fig. 2 is a side elevation of the same, one of the carriages carrying the side crimpers being removed. Fig. 3 is an enlarged view of a portion of Fig. 2, showing certain parts in section. Fig. 4 is an elevation, partly in section, of the heel-support for the last. Fig. 5 is a horizontal section taken on the line 5 of Fig. 4. Fig. 6 is a vertical section of the heel-support, taken on the line 6 of Fig. 4. Fig. 7 is a side view of the toe-support. Fig. 8 is a vertical section of the same, taken on the line 8 of Fig. 7. Fig. 9 is a partial vertical section upon an enlarged scale taken on the line 9 of Fig. 8. Fig. 10 is an enlarged vertical section of the mechanism for stretching the material around the last. Fig. 11 is an elevation of the same looking from the left of Fig. 10. Fig. 12 is a horizontal section taken upon the line 12 of Fig. 10. Fig. 13 is a similar view taken upon the line 13 of the same figure. Fig. 14 is an enlarged side elevation of the side-crimping mechanisms and the carriages upon which the same are mounted, the last being shown in section. Fig. 15 is an enlarged vertical section taken substantially on the line 15 of Fig. 14, looking toward the left. Fig. 16 is a section taken on the line 16 of Fig. 15. Fig. 17 is a section taken on the line 17 of Fig. 16. Fig. 18 is a horizontal section taken on the line 18 of Fig. 16. Fig. 19 is a similar view showing the parts in a different position. Figs. 20 and 21 are respectively an enlarged plan and side view of one of the tripping mechanisms for operating the catches which lock the heads carrying the side-crimpers. Fig. 22 is a plan view of the carriage carrying the gathering and crimping jaws which operate upon the heel of the last. Fig. 23 is a vertical section taken substantially on the line 23 of Fig. 22. Fig. 24 is a vertical section taken on the line 24 of Fig. 23, showing parts of the carriage in elevation. Figs. 25 and 26 are respectively a plan and an edge view, upon an enlarged scale, of one of the gathering-jaws. Fig. 27 is a front edge view of the two jaws when placed together. Fig. 28 is an inside elevation of the head carrying the gathering-jaws for the heel of the last. Fig. 29 is an enlarged section taken on the line 29 of Fig. 2. Fig. 30 is a section taken on the line 30 of Fig. 29. Fig. 31 is a horizontal section taken on the line 31 of Fig. 2. Fig. 32 is a vertical section taken on the line 32 of Fig. 31. Fig. 33 is an enlarged plan view of the side, heel, and toe crimping mechanisms and their auxiliaries. Fig. 34 is a similar view showing the same parts in a different position for the purpose of illustrating the operation of the machine.

Referring to said drawings, it is to be understood that the working parts of the machine are supported upon a table or bed-plate A, located at a suitable height to place the mechanisms in a convenient position for the operator. This bed-plate is provided upon its upper surface with T-channels $a$ $b$, which cross each other at right angles and form ways in which the heel and toe supports and the carriages upon which the crimpers are mounted move freely, so as to be adjustable to and from each other.

The construction and to a certain extent the operation of these several mechanisms will, for convenience, be first described in the order mentioned, after which the operation of the complete machine will be explained.

The mechanism for supporting the last consists of a heel-support B and a toe-support C. Each support consists of a threaded standard 10, having a head 9, which fits into the channel $b$ in the bed-plate, so as to move freely thereon. The standards are provided just above the bed-plate (see Figs. 4 to 9) with nuts 11, having handles 12, by which they can be turned so as to lock the supports in any position to which they are adjusted. Fitted onto the upper end of the standard which forms the heel-support is a tubular sleeve 13, having an internal spline 8, which enters a groove in the side of the standard and is made capable of being adjusted to different heights upon the standard. Just below this sleeve a standard is provided with an adjusting-nut 14, having an upward extension which fits over the lower end of the sleeve, and is connected thereto by means of a stud 7, which enters a circumferential groove formed in the sleeve. From this it results that by turning the nut the sleeve can be adjusted to any height required. The upper end of the sleeve is provided with a transverse dovetailed channel in which is seated a block 15, which is normally held in a central position by springs 6, secured to the sides of the sleeve with their ends resting against the ends of the block. By this means the block is permitted to have a slight movement with relation to the sleeve, but is prevented from being entirely withdrawn from the dovetailed channel by means of a screw 5, inserted from beneath. Extending from the top of the block is a rib 16, the upper end of which is rounded and receives a slotted tubular bearing 17, formed on the lower end of a stud 18, which is adapted to enter an opening in the heel portion of the last. The bearing 17 is sufficiently slotted to permit the stud 18 to have a slight rocking motion in the direction of the length of the last, so as to permit it to conform to the elevation of the toe of the last. The stud is normally held in its central position upon the rib 16 by means of springs 2, which are secured to the side of the sleeve 13, with their ends resting against the tubular bearing of the stud. The springs 2 6 permit the stud to have a slight lateral movement in both directions to allow the last to come to center, in case, as sometimes happens, the opening in the last for the stud 18 is not bored at the proper point. The amount of this movement of the stud 18 is or may be limited by the screw 5 and a set-screw 4, the end of which enters a recess in the side of the rib 16, and the stud may be secured rigidly in a vertical position by means of a set-screw 3, which can be made to abut against the upper flat surface of the rib. The standard 10, forming the toe-support, is provided with a tubular sleeve 13, which is also splined to the standard, so as to move freely up and down without turning, and carries at its upper end a head 19, upon which the toe portion of the last rests. This standard is also provided with an adjusting-nut 14 similar to the nut of the heel-support, by turning which the head 19 can be adjusted to any required height.

The toe-support is provided with a vamp-gage, which is constructed as follows: The sleeve 13 is provided just above the top of the standard with a transverse opening which forms a bearing for a short shaft 20, having an arm 21, to which is connected a light rod 22, (see Fig. 3,) the end of which forms a hook 23, which slides upon a scale 24, secured to a standard 25, which rises from the front of the bed-plate. The shaft 20 is provided with an arm 26, which projects through a slot upon the inner side of the sleeve 13 and extends upward upon the inner side of the toe-support. Pivoted to the upper end of the arm 26 is an arm 27, which extends upward and is provided at its end with a hook 1, which is adapted to engage with the lower edge of the quarter, as will hereinafter appear. The arm 27 is secured rigidly upon a stud which turns freely in the end of the arm 26, and this stud is provided with a spring 28, the end of which is held by a stud 29, projecting from the side of the arm 26 in such manner as to rock the arm 27 upward or downward, according to the position of the spring. In order to enable the arm 26 to be introduced into the slot in the sleeve, the shaft 20 is reduced in size at its inner end, so that the arm can be introduced into the slot and the shaft then inserted through the opening in the sleeve and arm, the arm being rigidly secured to the shaft by means of a thimble 30, introduced onto the smaller portion of the shaft and secured by a jam-nut 31, screwed onto the end of the shaft. The shaft 20 is provided with two arms 32, (see Fig. 3,) which project horizontally in opposite directions, and each of which is adapted to receive a weight 33, which acts to rock the shaft and the gage-arm 27 in one direction or the other, according to its position. The purpose of this organization will be made clear when the operation is explained.

The mechanism for stretching the material around the last to cause it to properly conform thereto consists, primarily, of a series of grippers D, (see Figs. 2 and 10 to 13,) which are operated to grasp the edges of the material by means of cam-levers d. These grippers are suspended from hooks 34, passing through heads E F, located directly above the last as it rests upon the heel and toe supports. The head E, from which the grippers which grasp the material at the sides of the last are hung, is secured to or made integral with a nut 35, which works upon a threaded tubular shaft 36, depending from an arm G, which rises from the bed-plate A and is bent so as to overhang the last. The nut 35 is made capable of turning about the shaft 36, so as to permit the grippers to be adjusted to different heights to conform to different classes of work to be done. The head E is provided with a spring-pressed locking-key 37, which enters a vertical groove in the side of the shaft 36, and thus locks the head in proper position with relation to the last after it has been adjusted to the proper height. Located upon the top of the head E is a plate 38, of rubber, upon the upper side of which the nuts 39 of the hooks 34 rest, and which yields sufficiently to conform to slight inequalities in the material and irregularities in the position in which the grippers are attached, and thus puts all parts of the material under equal strain, as will hereinafter appear. Any other means of yieldingly supporting the hooks may of course be employed in place of the rubber plate. The head F, which carries the grippers which act upon the material at the toe portion of the last, extends into a recess formed in the end of the head E and is provided with a sleeve 40, which fits around and rests upon the shoulder formed upon the lower end of a nut 41, which works upon the shaft 36 above the nut 35. The nut 41 is provided above the sleeve 40 with a hand-wheel c, by which it can be turned so as to raise and lower the head F independently of the head E, and thus adjust the grippers at the toe portion of the last to the proper position relatively to the grippers at the sides of the last. The head F may be provided with a rubber plate similar to the plate 38, and for the same purpose; but the hooks which support the toe-grippers will preferably be suspended from a system of equalizing-levers 42, fulcrumed upon the head and arranged, as shown in Fig. 11, so as to equalize the strain upon each of the grippers. The main lever 42 is acted on by a spring 43, which tends to normally maintain the levers in a horizontal position. The shaft 36 passes through a bearing formed in the overhanging end of the arm G and is arranged to have a free vertical movement therein. Fulcrumed upon the arm G is a hand-lever 44, which passes through a slot in the upper end of shaft and extends forward in convenient position to be grasped by the operator. Fulcrumed upon this lever near its forward end by means of a link connection is a second lever 45, which passes through the slot in the upper end of the shaft 36 and is pivotally connected to the shaft, and, extending rearward, is connected to a rod 46, which passes downward through the axis of the arm G and is connected to a treadle-lever H, fulcrumed at the base of the machine. Connected to the lever 44 by means of a light spring 47 is a presser-rod 48, which extends downward through the hollow shaft 36 and is provided at its lower end with a foot 49, which is in position to rest upon the upturned bottom of the last between the heel and toe supports. The foot 49, which is pivoted to the lower end of the rod 48, is provided with a light spring 50, the tendency of which is to hold the foot in substantially a horizontal position, and the foot is serrated on its under side, so as to take a firm hold upon the last and be prevented from moving thereon. The hand-lever 44 is provided with a spring hand-piece 51 of the ordinary form, which is pivoted upon the lever and is connected by a rod 52 with a pivoted catch 53, which is arranged to engage with a stop 54 upon the end of the arm G. By raising the lever 44 the shaft 36 and all the parts carried thereby, including the rod 48 and its foot and the grippers, can be raised until the catch 53 engages with the stop 54, when the grippers and the foot will be held away from the last. When in this position it is desirable, in order to readily introduce and remove the last, that the parts carried by the arm G should be capable of being moved to one side out of the way. To permit this the arm is pivoted (see Figs. 31 and 32) so as to turn in its bearing in the bed-plate, and thus form a horizontally-moving carrier for the grippers and other parts, which will allow them to be swung to one side, as indicated by dotted lines in Fig. 1. In order to arrest the arm G when the grippers and the foot have been brought into proper position over the last, the arm is provided with a lug 56, which engages with a stop 55 upon the bed-plate and arrests its movement at the proper point. In order to lock the arm in this position, which sometimes may be desirable, the end of the lever 44 may be extended beyond its fulcrum and connected to a tubular sleeve 57, which surrounds the rod 46, and is connected to a lever 58, fulcrumed beneath the bed-plate, which is connected to a locking-pin 59, which works in an opening in the bed-plate and enters a corresponding opening formed in the base of the arm G. By this means, whenever the lever 44 is raised, so as to raise the grippers and the foot away from the last, the sleeve 57 and lever 58 will be depressed, so as to withdraw the pin 59 from the opening in the base of the arm and allow the latter to be turned to one side. On the other hand, when the foot is lowered onto the last the sleeve and lever will be raised, so as to cause the pin to enter the opening in the base of the arm and lock the arm in that position until the foot is again raised.

The operation of the mechanism thus far described is as follows: The naked last I, provided at its heel with an opening to receive the stud 18, will be placed upon the heel and toe supports with the stud entering the opening in the heel portion of the last and the toe portion of the last resting upon the toe-support, as shown in Fig. 3. The nuts 11 will then be loosened and the heel and toe supports adjusted in the channel b to the proper positions and to the proper distance from each other, and will then be locked in position by screwing down the nuts 11. The nuts 14 will then be operated until the upturned bottom of the last is at the proper height and until the toe and heel portions have the proper relative elevation. As the toe is elevated or the heel depressed the stud 18 will rock upon the rib 16, so as to permit this adjustment to be readily made. During this operation the carriages carrying the side-crimpers and the heel and toe gathering and crimping jaws will be moved away from each other to the position shown in Fig. 33 in a manner which will be presently explained, so as to permit the last to be readily introduced and removed and afford free access to the heel and toe supports for the purpose of adjustment. The side-crimpers and the heel and toe gathering and crimping jaws will then be properly adjusted to conform to the size and shape of the last, as will be hereinafter explained. The heel and toe supports and the crimpers having been properly adjusted to conform to the size and shape of the last which is to be used, the naked last will be removed and a similar last provided with an insole e and upper f g, ready for lasting, will be placed upon the heel and toe supports, as indicated in Fig. 3. The arm G, carrying the grippers D and the presser-rod 48, will be swung inward from the position indicated by dotted lines in Fig. 1 to the position indicated in Fig. 2 and by the full lines in Fig. 1, so as to bring the grippers directly over the last, in which position the arm will be arrested by the stop 55. The catch 53 will then be disengaged from the stop 54, and the shaft 36 and the parts carried thereby lowered, so as to bring the foot 49 down onto the last. As this is down, the sleeve 57 will be raised, so as to raise the lever 58 and cause the pin 59 to project upward into the opening in the base of the arm G, and thereby lock the arm in that position. The key 37 will then be withdrawn and the heads E F revolved about the shaft 36 until the grippers which are to grasp the material at the sides of the last are adjusted to the proper height. The key will then be allowed to enter the groove in the shaft, so as to lock the heads in that position. The hand-wheel C will then be operated, so as to raise or lower the head F and adjust the grippers which are to act upon the material at the toe of the last to the proper height relatively to the other grippers. The grippers will then be closed upon the upwardly-projecting edges of the material around the last, as indicated in Fig. 2. The head E is, as will be observed, provided with a large number of openings to receive the hooks from which the grippers are suspended, so that the grippers can be adjusted to different positions and so that a greater or less number of grippers can be employed upon each side of the last, according to the size of the last and the quality of the material to be lasted. The grippers having been made fast to the edges of the material, pressure will be applied to the treadle-lever H, thereby rocking the lever 45 upon its fulcrum and lifting the shaft 36 and the grippers, and at the same time exerting a downward pressure upon the lever 44, so as to force the rod 48 and foot 49 downward onto the last to prevent it from being lifted away from the heel and toe supports, and this will be continued until the material has been subjected to sufficient strain to be properly stretched around the last and caused to conform thereto. During this operation the rubber plate 38 will yield sufficiently to compensate for any slight variations in the positions in which the grippers are clamped to the edges of the material, and thus subject all parts of the material to an equal strain and also equalize the strain upon the opposite sides of the last, and the equalizing-levers 42 will act in the same manner to equalize the strain produced by the several grippers at the toe portion of the last. It will be observed that during this operation the last is held in position by the downward pressure exerted through the rod 48, acted upon by the lever 44, while the strain upon the material is produced by the upward movement of the shaft 36, acted upon by the lever 45. From this it results that the last is not forced downward onto its toe-support, so as to bind the material at that point, but, on the contrary, leaves it free to be stretched equally over all portions of the last.

If the shoe or boot being lasted is provided with a vamp $g$, as in the case shown, it is desirable that the material should be so stretched that the vamps of each pair or each lot of completed boots or shoes will be of exactly the same length. When, therefore, boots or shoes of this character are being lasted, the free end of the spring 28 is placed behind the stud 29, as shown in Figs. 3, 7, and 8, so as to throw the end of the gage-arm 27 upward and cause it to rest against the last just inside the toe-support and in position for its hook 1 to engage with the overlapping edge of the quarter $f$, the weight 33 being upon the inwardly-projecting arm 32, so as to tend to move the gage-arm toward the heel of the last. With the gage in this position it will be readily seen that as the material is stretched around the end of the toe of the last the edge of the quarter will be drawn downward toward the toe, thereby moving the gage with it and, through the connections which have been described, moving the rod 22 along the scale 24. When the material has been properly stretched, the position of the end of the rod upon the scale will indicate the length of the vamp, and the gage 60, with which the scale is provided, will then be moved up against the end of the rod and secured in that position, as shown in Fig. 3. When the next shoe or boot is lasted, the operator will press upon the treadle-lever until the end of the rod 22 is brought against the gage 60, and by that means the vamps of the several boots or shoes of the lot will be made of uniform length. If the vamp overlaps the quarter, the operation will be the same, except that the weight 33 will be transferred to the outwardly-extending arm 32 of the shaft 20, so that the end of the gage-arm will abut against the edge of the overlapping vamp. When the boot or shoe being lasted is not provided with a vamp, the free end of the spring 28 will be removed from behind the stud 29, which will allow the gage-arm to swing downward into the recess in the head 19 and remain idle, as indicated by dotted lines in Fig. 8. It is of course apparent that the shaft 20 may be rocked by a spring instead of by the weight 33, and a spring is therefore to be considered as the equivalent of the weight for this purpose. The material having been thus stretched and conformed to the last is ready for the crimping operation.

The mechanism for crimping the material over at the sides of the last consists, primarily, of four crimpers K L M N, two for the right last and two for the left. These crimpers are arranged in pairs upon opposite sides of the last, each pair being composed of a crimper for one side of each last. The pairs of crimpers are carried by revolving heads or carriers O, which are mounted upon carriages P, adapted to slide in the channel $a$ in the bed-plate. The revolving heads upon which the crimpers are supported and their carriages are duplicates, and a description of one will therefore apply to both. The heads O are herein described as "revolving," although, as will hereinafter appear, they make but a half-revolution in either direction. The term is not therefore used in a strict sense, but merely as indicating the direction of movement of the heads in being reversed. Each crimper is composed of a number of flat side lasting or crimping fingers $h$, which are arranged side by side and are independently adjustable, both vertically and horizontally, so as to give the crimper any desired outline to conform to the shape of the last. The side lasting or crimping fingers are composed of flat pieces of steel bent to U shape, with one arm slightly longer than the other. The shorter arms 61, which serve as shanks to the fingers, are turned so that their greatest width is at right angles to the greatest width of the longer arms 62, forming the crimping-fingers proper, and are secured side by side between metal blocks 63, which are arranged in chambers $k$, formed in the heads. The blocks are fitted loosely in the chambers $k$, so as to be free to move to and from each other, but are held against vertical movement by means of ribs 64, (see Fig. 16,) which enter recesses in the edges of the blocks. The shanks of the crimping-fingers having been introduced between the upper projecting ends of the blocks 63 are secured in any position to which they are adjusted by means of set-screws 65, which are set up against the end of the series of blocks, so as to bind the whole together firmly. Plain blocks 66, (see Fig. 17,) corresponding in thickness to the shanks of the crimping-fingers, are placed between the lower ends of the blocks 63. The chambers $k$ are provided with springs 67, controlled by screws 68, which press against the blocks 63 with sufficient force to hold the fingers in position during the process of adjustment. The heads O, which carry the crimpers, are mounted upon vertical studs 69, (see Figs. 15 and 16,) which turn freely in tubular bearings 71, which are screw-threaded upon their exteriors and work in nuts 70, formed in the carriages P. These tubular bearings 71 are provided with handles 72, which project outward at the sides of the heads and by operating which the bearings can be turned in the nuts 70, so as to raise and lower the heads and their crimpers slightly for a purpose that will be hereinafter explained. Secured to the lower end of each of the studs 69 is a small pinion 73, which is engaged upon its opposite sides by two loose rack-bars 74 75, (see Figs. 15 and 18,) the ends of which project outward beyond the carriage. These rack-bars are held in engagement with the pinion by means of bearers 76, formed by the sides of the carriage. The bearers 76 are beveled at their outer edges, as indicated at 77, so as to permit the rack-bars to swing outward from each other; but the carriage is provided with a pair of springs 78, which bear against the outer sides of the bars and tend constantly to force them inward to a position parallel with each other. The stud 69 is provided below the pinion 73 with a disk 124, which projects beneath the rack-bars and acts to raise the bars with the pinion, when the head is raised, by turning the tubular bearing 71. Each of the bars is provided upon its inner side near its outer end with a cam projection 79, and these two projections are so arranged that as they are forced past each other by the movement of the bars in opposite directions they tend to force the racks apart against the tension of the springs 78. The two carriages which carry the side-crimpers are provided with nuts in which work right and left hand screw-threads formed upon a shaft Q, which extends across the machine and turns in stationary bearings 80, and is provided with a hand-wheel $l$, by which it can be operated so as to move the carriages, and with them the heads carrying the crimpers, to and from each other, and thus cause the crimpers to approach and recede from the opposite sides of the last. The bearings 80 are held in fixed positions in the channel $a$ by means of nuts 81, which may be operated by a wrench or may be provided with handles, as shown in Figs. 18 and 19. The bearings 80 are extended above the shaft Q and afford abutments for the ends of the rack-bars 74 75, and each of the abutments thus formed is provided upon its opposite edges with flanges 82, which are adapted to engage with corresponding projections 83, formed upon the ends of the bars. The purpose of this will appear when the operation of this part of the machine is described. In order to prevent a sudden shock when the rack-bars are brought against the abutments, the flanges 82 will preferably be formed upon plates 84, which are hinged at their bottoms, as shown at 85, and rest against blocks 86, of rubber or other yielding material, which will operate to prevent any jar or concussion. The carriages P are limited in their outward movement by stops 125 upon the bed-plate.

In order to lock the heads O and crimpers in proper position for the crimping operation and release them in proper time to receive their rotary movement from the rack-bars, as will be presently explained, each of the carriages is provided with a catch 87, which is normally held by a spring 88 in such position as to enter one or the other of two recesses 89 in the stud 69 and lock the head against rotary movement. Each of the catches 87 is provided with a tail-piece 90, which, as the carriages are moved from each other, engages with a pivoted cam 91 upon the bed-plate, (see Figs. 18 to 21,) which operates to withdraw the catch from the recess in the stud and release the head, so as to permit it to be revolved. The cam 91 is of such length, however, that as soon as a half-revolution of the head has been completed the tail-piece of the lever will pass the cam, when the spring 88 will operate to again cause the catch to lock the head in that position. Upon the reverse movement of the head the tail-piece will pass upon the opposite side of the cam and the cam will be swung inward against the tension of its spring 92, so as to permit the tail-piece to pass, and as soon as the tail-piece has passed the cam will be again restored to its proper position to disengage the catch upon the reverse movement of the head.

The operation of the side-crimping mechanism is as follows: The naked last I having been placed upon the heel and toe supports and these supports adjusted to bring the last to the proper elevation and inclination, as before explained, the hand-wheel $l$ will be operated, so as to move the carriages toward each other and cause the crimpers K L to approach the opposite sides of the last. When the carriages have arrived in the position or about the position shown in Figs. 14 and 34, the fingers composing the two adjacent crimpers will be loosened by backing out the set-screws 65, and the shanks of the crimping-fingers will then be shifted vertically or horizontally, or both, between the blocks 63 until the ends of the fingers proper are in proper position to conform to the outline of the last which is in the machine, which for convenience will be assumed to be the last for the left foot, as indicated in Figs. 14 and 33. The crimping-fingers $h$ being independently removable, the number of fingers used will be governed by the length of the last. Plain blocks will be introduced between the blocks 63 to take the place of the shanks of the removed fingers. The fingers having been thus adjusted to conform to the outline of the last, they will be locked in that position by setting up the screws 65. The hand-wheel $l$ will then be operated to move the carriages away from each other and from the last, and this will be continued until the rack-bars 74 are arrested by their outer ends coming into contact with the abutments 80, as shown in Figs. 16 and 18. Just before this takes place the tail-pieces of the catches 87 will engage with the cams 91, so as to rock the catches outward and release the studs 69, so as to permit the heads to be revolved freely. After this the continued outward movement of the carriages will cause the pinions 73 to travel on the stationary rack-bars 74, and thus impart a rotary movement to the heads or carriers O, carrying the crimpers, as indicated by the dotted lines and the arrows in Fig. 33, and this will be continued until the heads have received a half-revolution, thereby reversing the crimpers and bringing the crimpers N M adjacent to each other. Before the heads have completed this half-revolution the tail-pieces of the catches 87 will have passed the cams 91, as indicated in Fig. 19, so as to permit the catches to be rocked inward into position to enter one of the recesses 89 in the studs and lock the heads as soon as the half-revolution is completed. After the rack-bars 74 are arrested, as shown in Fig. 18, the rack-bars 75, which engage with the opposite sides of the pinions 73, will be moved outward, and as they are thus moved outward the cam projections 79 will come into engagement. The projections 83 upon the ends of the rack-bars 74 being in engagement with the flanges 82 of the abutments, the rack-bars 74 will be held stationary, and as a consequence the rack-bars 75 will be rocked laterally, so that as they are moved outward their ends will pass upon the outsides of the abutments, as indicated in Fig. 19. The heads carrying the crimpers having thus been reversed, the last for the other foot, which in the case assumed will be the right foot, will be placed upon the heel and toe supports, and the hand-wheel $l$ will be reversed, so as to advance the other pair of crimpers to the opposite sides of the last. The fingers of the crimpers M N will then be adjusted to conform to the outline and size of the right last, the same as already described in connection with the crimpers for the left last. As the carriages P are advanced toward the last, the rack-bars 74 75 will be carried inward with the carriages until the ends of the bars 75, which project outside the abutments, pass the abutments when the spring 78 will operate to rock these bars inward to a position parallel with the other bars. As the carriages are thus moved inward, the tail-pieces 90 of the catches 87 will pass upon the outsides of the cams 91, thereby swinging the cams inward, as indicated by dotted lines in Fig. 20, so as to allow the tail-pieces to pass, after which the cams will be restored to their normal position by the springs 92. The crimpers for the second last of the pair having been adjusted to conform to the last, the hand-wheel $l$ will be operated to again move the carriages outward to carry the crimpers away from the last. As the carriages are thus moved outward a second time, the rack-bars 75 will engage with the abutments, and the heads carrying the crimpers will be given a half-revolution and reversed in the manner already described, except that in this case the heads will be revolved in the reverse direction and the bars 74 will be rocked outward, so as to be projected past the abutments.

The mechanisms for crimping or folding over the material at the heel and toe of the last are mounted, respectively, upon carriages R, which move in the channel $b$ outside the heel and toe supports. These two carriages are provided with nuts in which work right and left hand screw-threads formed upon a shaft T, which turns in a stationary bearing 93, also made fast in the channel $b$, and is provided with a hand-wheel $m$, by which it can be operated so as to move the carriages R to and from each other to bring the heel and toe crimpers into and out of operation. The two crimpers S V for the heel and toe and their auxiliaries are with slight exceptions exact duplicates, and a description of one will therefore apply to both. Each crimper is composed, primarily, of a pair of gathering and crimping jaws 94, (see Figs. 22 to 27,) which are pivoted to turn horizontally to and from each other upon a stud 95, mounted in a head-plate 96, which is in turn supported upon a second plate 97, having a tubular sleeve 98, which enters a bearing formed in a head-block 99, which is supported upon a shaft 100, mounted horizontally in the carriage R. The two jaws 94 of each pair are of substantially the same form, and consist of hinge portions $n$, which overlap and turn upon the stud 95, as shown in Figs. 23 to 27, and body portions $o$, having jaw-edges $p$, which are in the same plane and are of a shape to conform approximately to the contour of the heel and toe of the last. The edges of the jaws fit beneath flanges $q$, formed on the edges of the plate 96, (see Figs. 22 and 23,) and the jaws are provided upon their under sides with projecting portions $s$, which fit into and move in grooves $t$, formed in the top of the plate 96. Passing through the plates 96 97 and the tubular sleeve 98 and entering a nut formed in the head-block 99 is a threaded rod 101, having a shoulder, by which it is prevented from moving longitudinally in the sleeve, and is provided with a hand-wheel $u$, by which it can be turned so as to adjust the vertical position of the plates and the gathering-jaws 94. The head-block is provided with a segmental gear 102, which is engaged by a worm 103 upon a shaft 104, mounted upon the carriage R and having a hand-wheel $v$, by which it can be operated so as to rock the head-block upon the shaft 100, and thus vary the inclination of the jaws 94 to any desired extent. By these means the height and inclination of the gathering-jaws can be varied to suit any form of last that it may be required to operate upon. The gathering-jaws are provided with laterally-extending arms 105, having elongated openings 106, through which pass a pair of arms 107, which are pivoted in slotted heads 108, secured to the ends of the shaft 100, and this shaft is also provided with an arm 109, having a swiveled nut 110, in which works a threaded rod 111, which passes through a swiveled bearing 112, secured to a standard 25, rising from the bed-plate of the machine, and has a hand-wheel $w$, by which it can be adjusted, so as to vary the position of the nut upon the rod. The rod is provided with a collar 113, by which it is prevented from moving inward through the bearing, and with a spring 114, which resists its movement in the opposite direction. The head-plate 96 is not secured rigidly to the plate 97, but is free to be turned about the rod 101, and for the purpose of adjusting the plate so as to move the gathering-jaws laterally to meet the requirements of any last of irregular shape the plate 97 is provided with upwardly-extending ears, in which work adjusting-screws 115, which abut against the sides of the rear end of the head-plate. By this means the position of the head-plate can be shifted so as to move the jaws laterally within certain limits to meet the requirements of any irregular-shaped last. The rod 101 is provided just above the head-plate with a fixed collar and a washer 128, between which and the head-plate there is interposed a yielding spring 127, of rubber or other material, and a loose washer, which will allow the head-plate to yield vertically and thus permit the jaws 94 to adjust themselves in height to conform to any inequalities in the thickness of the material or inaccuracy in the adjustment of the heel and toe supports.

The foregoing description applies equally to the mechanisms which act upon the heel and toe of the last. The mechanism which acts upon the heel of the last is provided, in addition to the parts which have been described, with a spring-seated presser-plate 116, which is shaped to conform, approximately, to the contour of the heel of the last, and is supported upon the inner edge of the head-plate 96 just below the gathering-jaws, as shown in Figs. 22, 24, and 28. This presser-plate is composed of a light elastic plate $x$, which is curved to fit, approximately, the contour of the heel of the smallest last, but will spread to conform to larger lasts, and a heavier backing-plate $y$, which is cut away at its center and serves to give increased stiffness and elasticity to the whole structure. This presser-plate serves to hold the material firmly against the heel of the last while the edges are being gathered and folded over by the gathering and crimping jaws.

The remaining features in the construction of the mechanisms which operate upon the heel and toe of the last will be described in connection with an explanation of the operation of these mechanisms, which is as follows: The naked last I having been placed upon the heel and toe supports and adjusted to the proper height and inclination, as before described, the hand-wheel $m$ will be operated to advance the carriages R and move the gathering-jaws up to the heel and toe of the last to the position indicated in Figs. 3 and 34. As the carriages are thus advanced, the collars 113 of the rods 111 will abut against the stationary bearings 112 and prevent the inward movement of the rods, so that the rods will draw upon the arms 109, thereby rocking the shafts 100, and, through the arms 107, turning the gathering-jaws so as to cause the edges $p$ of the jaws to approach each other over the heel and toe portions of the last, as shown in Fig. 34. The carriages having been moved inward, so as to bring the gathering-jaws to this position, the rods 101 104 will be operated so as to adjust the jaws to exactly the proper height and inclination to conform to the size and shape of the last, and the rods 111 will be adjusted in the nuts 110, so as to cause the jaws to be closed to exactly the proper extent when the carriages are in that position. The arms 109 are provided with a number of openings $i$ to receive the shanks of the swiveled nuts 110, and the standards 25 are provided with similar openings $r$ to receive the shanks of the swiveled bearings 112. By this means the rods 111 can be connected to the arms 109 at a less or greater distance from the shafts 100, and thus cause the gathering-jaws to close more or less quickly. The heel and toe crimping mechanisms having been thus adjusted, the hand-wheel $m$ will be operated so as to move the carriages R away from each other and from the ends of the last, as indicated in Figs. 2 and 33.

In making the adjustments which have been described the heel and toe supports and the head-plates carrying the gathering-jaws will be so adjusted that when the carriages are moved from each other, as in Figs. 2 and 33, the distance between each end of the last and the jaws which operate at that end will be the same, so that when the carriages are again advanced the jaws at the opposite ends of the last will arrive at their respective ends of the last simultaneously. This adjustment having been made with the naked last for a pattern, it is in some cases necessary to correct it to conform to the change in the length of the last produced by the addition of the material to be lasted. If the boot or shoe is of such style that the thickness of the material at the heel and toe of the last is equal, then the adjustment made upon the naked last will not need correction; but if, as is frequently the case, the counter at the heel or a box at the toe makes the material thicker at one end of the last than at the other, then it is necessary to correct the adjustment of the gathering-jaws to compensate for such inequality in the thickness of the material. To effect this quickly and easily, the screw-shaft T, which operates the carriages R, is provided with a loose threaded sleeve 117, (see Figs. 2, 29, and 30,) which is fitted between the hub of the hand-wheel $m$ and a shoulder 118, formed on the shaft, and works in a nut formed in the bearing 93. The sleeve 117 is provided with a collar 119, from which projects a handle 120, by which the sleeve can be turned in the bearing, so as to give a limited longitudinal movement to the shaft T and thus shift both of the carriages R slightly in either direction. By this means the carriages, and with them the gathering-jaws, can, after the jaws have been adjusted to the naked last, be shifted in either direction to compensate for any difference in the thickness of the material at the heel and toe of the last and cause the jaws, when the carriages are advanced, to arrive simultaneously at the opposite ends of the last. In order to hold the sleeve 117 in any position to which it is adjusted, the collar 119 is provided with a spring-pressed locking-pin 121, which is operated by a small lever 122, pivoted upon the handle 120, and is arranged to enter any one of a series of openings 123, formed in the bearing 93, and thus lock the sleeve in any position to which it is adjusted.

The general operation of the machine constructed and organized as has been described is as follows: In view of the explanations of the operation of the several mechanisms which have been given a very brief explanation will be sufficient to convey an understanding of the operation of the organization as a whole. The various mechanisms having been adjusted as has been described, a last similar to the one used in adjusting, but provided with an insole and upper and in proper condition for the lasting operation, will be placed upon the heel and toe supports, as shown in Fig. 33, and the material will be stretched to conform to the last in the manner that has already been described in connection with the mechanism for that purpose and as shown in Fig. 2. This having been done, the handles 72 will be turned from the position shown in Fig. 34 to the position shown in Fig. 33, so as to give a partial turn to the tubular bearings 71, and thereby raise the heads or carriers O, carrying the side-crimpers a short distance, and the hand-wheel $l$ will be operated so as to move the carriages carrying the side-crimpers inward from the position shown in Fig. 33 toward the opposite sides of the last and cause the crimpers L K (or N M, as the case may be) to press against the upwardly-projecting edges of the material held by the grippers and fold it over onto the insole, as indicated in Figs. 14 and 34. During this operation the bearing of the stud 18 will, if necessary, slide in one direction or the other upon the rib 16 against the tension of one of the springs 2, so as to cause the crimpers upon the opposite sides to press equally upon the material. At the same time the side crimpers are advanced the hand-wheel $m$ will be operated, so as to cause the the carriages R, carrying the gathering-jaws, to move inward from the position shown in Fig. 33 toward the heel and toe of the last. As these carriages are moved inward the springs 114, which have been compressed by the outward movement of the carriages, will expand, thereby moving the rods 111 through their bearings 112 until the collars 113 of the rods abut against said bearings, and the parts will be so adjusted that when this takes place the gathering-jaws will be near to the ends of the last. By then moving the carriages R inward a short distance farther the rods 111 will operate to rock the shafts 100 and close the gathering-jaws inward over the heel and toe of the last, so as to fold the upwardly-projecting edges of the material over onto the insole at the heel and toe, as indicated in Figs. 3 and 34, and at the same time the presser-plate 116 will bear against the heel of the last with a yielding pressure, so as to cause the material to fit smoothly over that portion of the last. During this operation the block 15, carrying the stud 18, will, if necessary, move in its seat in the sleeve 13 against one of the springs 6, so as to allow the last to move slightly lengthwise to compensate for any slight inaccuracy in the adjustment of the parts. As the side and heel and toe crimpers are thus advanced and fold over the material, the pressure upon the treadle-lever H will be partially relieved, so as to permit the material to be folded over, as has been described. After the material has been thus folded over, the handles 72 will be moved in the reverse direction to the position shown in Fig. 34, so as to lower the heads O, carrying the side-crimpers, and cause the ends of the crimping-fingers to press down firmly onto the material at the sides of the last, as shown in Fig. 14. The fingers, being made of spring metal, will yield independently of each other to compensate for inequalities in the thickness of the material due to seams, &c. The grippers will then be released from the edges of the material and raised and swung to one side, after which the material, while held by the crimpers, will be tacked in position in the usual manner. The hand-wheel *l* will then be operated to move the carriages P and the side-crimpers away from the last, and as this is done the heads O, carrying the crimpers, will be given a half-revolution and be reversed in the manner already described and as indicated by the dotted lines and the arrows in Fig. 33, so as to bring the other set of crimpers into position for operation. The carriages R, carrying the heel and toe crimpers, will also be moved away in the manner already described, and as this is done the tension of the springs 114, acting upon the nuts 40, will rock the arms 107 and shafts 100, so as to open the gathering-jaws, after which the springs 114 will be compressed between the nuts and the bearings, as shown in Fig. 33. The last which has been operated upon will then be removed, and the one for the other foot, having the upper in condition for lasting, will be inserted in its stead, as indicated by dotted lines in Fig. 33, and the operation will be repeated, a left and a right last being operated upon alternately. The machine having been adjusted as described will not require further adjustment until the size and style of the last are changed.

If at any time it should be desired to last a number of boots or shoes for one foot in succession, the rack-bars 74 75 will be thrown out of operative position, so that the heads O will not be reversed as the carriages P are withdrawn. For this purpose the carriages are provided with set-screws 126 (see Figs. 18 and 19) or other suitable means by which the required one of each pair of the bars can be rocked to and held in such position as not to engage with its abutment 80.

What I claim is—

1. In a lasting-machine, the combination, with the bed-plate A, having the upwardly-opening T-channel *b*, of the heel and toe supports having heads 9, adjustable in said channel, and the nuts 11 above the bed-plate for locking said supports in position, substantially as described.

2. The combination, with mechanism for stretching and crimping the material around the last, of a heel-support and the toe-support consisting of the threaded standard 10, head 19, sleeve 13, and adjusting-nut 14, working on said standard, substantially as described.

3. The combination, with mechanism for stretching and crimping the material around the last, of a toe-support and the heel-support consisting of the threaded standard 10, stud 18, sleeve 13, and adjusting-nut 14, working on said standard, substantially as described.

4. The combination, with heel and toe crimpers, of a toe-support and the heel-support having the stud 18 to enter an opening in the last, and the horizontally-sliding block 15, carrying said stud, substantially as described.

5. In a lasting-machine, the combination, with the crimping mechanism, of the heel-support having the horizontally-sliding block 15 and having the stud 18, carried by said block and free to slide thereon, whereby the stud is made self-adjusting in two directions, substantially as described.

6. The combination, with mechanism for supporting the last and mechanism for stretching the material around the last, of the gage-arm 27, arranged to engage with the edge of the quarter (or vamp, as the case may be) to indicate the length of the vamp, substantially as described.

7. The combination, with mechanism for supporting the last and mechanism for stretching the material around the last, of the rock-shaft 20, carrying the gage-arm 27 to engage with the edge of the vamp, (or quarter, as the case may be,) the arms 32, and movable weight 33, substantially as described.

8. The combination, with mechanism for supporting the last and mechanism for stretching the material around the last, of the rock-shaft 20, carrying the gage-arm 27 to engage with the edge of the vamp, (or quarter, as the case may be,) the arm 21, rod 22, and scale 24, substantially as described.

9. The combination, with mechanism for supporting the last, of the grippers D, the presser-rod 48, and the levers 44 45, one fulcrumed on the other and one acting to raise the grippers and the other to depress the rod 48, substantially as described.

10. The combination, with the vertically-moving shaft 36, supporting the grippers, and the vertically-moving presser-rod 48, of a lever for raising said shaft and rod together from the last and a catch for holding them in their raised position, substantially as described.

11. The combination, with mechanism for supporting the last, of the shaft 36, supporting the grippers, the presser-rod 48, the lever 44, fulcrumed to act upon the rod 48 to depress it, the lever 45, fulcrumed upon the lever 44 and acting upon the shaft 36 to raise it, and the treadle-lever H, connected to operate said lever 45, substantially as described.

12. The combination, with the vertically-moving shaft 36, carrying the grippers and supported upon a horizontally-moving carrier G, of the presser-rod 48, also supported upon said carrier, and two levers 44 45, also supported upon said carrier and acting upon said shaft and rod to move them in opposite directions, substantially as described.

13. The combination, with side-stretching devices and the grippers D, which act at the toe portion of the last, of equalizing-levers 42, supporting said grippers and equalizing the strain upon them, substantially as described.

14. The combination, with the threaded shaft 36, of the nut 41, working on said shaft and having the hand-wheel c, and the head F, supported on said nut and carrying the grippers D for the toe portion of the last, substantially as described.

15. The combination, with the presser-rod 48 and the vertically-moving shaft 36, of the grippers D, suspended from a head adjustable vertically upon said shaft, substantially as described.

16. In a lasting-machine, the combination, with the vertically-moving shaft 36, of the grippers D, suspended from two heads E F, independently adjustable upon said shaft, substantially as described.

17. The combination, with the vertically-moving threaded shaft 36, of the nut 41, working on said shaft, and the head F, carrying toe-grippers, supported on said nut, substantially as described.

18. The combination, with the vertically-moving threaded shaft 36, of the head E, having a nut working on said shaft, the locking-key 37, the nut 41, working on said shaft, and the head F, carrying toe-grippers, supported on said nut 41 and entering a recess in the head E, substantially as described.

19. In a lasting-machine, a side-crimper for a lasting-machine, composed of a plurality of U-shaped side lasting-fingers h, the shanks 61 of which are adjustable both vertically and horizontally, substantially as described.

20. In a lasting-machine, the combination, with the side lasting or crimping fingers h, of the blocks 63 and means for locking the blocks and fingers, substantially as described.

21. In a lasting-machine, the combination, with the side lasting or crimping fingers h, of the blocks 63, spring 67, and locking-screw 65, substantially as described.

22. The combination, in a lasting-machine, of two pairs of side-crimpers mounted upon reversible heads or carriers upon opposite sides of the last, whereby the two pairs can be brought into operation alternately, substantially as described.

23. The combination, in a lasting-machine, of two pairs of side-crimpers mounted upon reversible heads or carriers upon opposite sides of the last, whereby the two pairs can be brought into operation alternately, and mechanism for reversing said heads, substantially as described.

24. The combination, in a lasting-machine, of two pairs of side-crimpers mounted upon reciprocating reversible heads or carriers upon opposite sides of the last, whereby the two pairs can be brought into operation alternately, and mechanism for reciprocating and reversing said heads, substantially as described.

25. The combination, in a lasting-machine, of two pairs of side-crimpers mounted upon vertically and horizontally moving reversible heads or carriers, whereby the two pairs can be brought into operation alternately, and mechanism for moving said heads vertically and horizontally and for reversing the same, substantially as described.

26. In a lasting-machine, the combination, with two pairs of side-crimpers mounted upon reversible heads or carriers O, of reciprocating carriages P, carrying said heads, substantially as described.

27. In a lasting-machine, the combination, with two pairs of side-crimpers mounted upon reversible heads or carriers O, of reciprocating carriages P, carrying said heads, and the right and left screw-shaft for operating the carriages, substantially as described.

28. The combination, with two pairs of side-crimpers mounted upon reversible heads or carriers O, having pinions 73, of the reciprocating carriages P, carrying said heads, and the movable rack-bars 74 75 for reversing the heads, substantially as described.

29. The combination, with two pairs of side-crimpers mounted upon reversible heads O, having pinions 73, of the reciprocating carriages P, carrying said heads, the movable rack-bars 74 75 for reversing the heads, and means for throwing said rack-bars out of operation, substantially as described.

30. The combination, with the reversible heads O, having pinions 73, of the rack-bars 74 75 and the yielding abutments 80, substantially as described.

31. The combination, with the reversible heads O, carrying the side-crimpers, of the catches 87 for locking said heads and the cams 91 for disengaging the catches, substantially as described.

32. The combination, with the heads O, carrying the side-crimpers, and their carriages P, of the nuts 70, threaded bearings 71, and handles for operating the latter, substantially as described.

33. The combination, with the gathering and crimping jaws 94, of the vertically-adjustable head-plate 96, the rocking head-block 99, having the segment 102, and the screw-rod and worm 101 103, substantially as described.

34. The combination, with the carriages R and the right and left hand screw-rod T for simultaneously moving the carriages to and from each other, of the rocking head-blocks 99, mounted upon said carriages and carrying the vertically-adjustable head-plates 96, and the hinged gathering and crimping jaws 94, pivoted upon said head-plates, substantially as described.

35. The combination, with the gathering and crimping jaws 94, carried upon the reciprocating carriage R, of the rock-shaft 100, having arms 107 109, and the adjustable rod 111, passing through the stationary bearing 112, substantially as described.

36. The combination, with the gathering and crimping jaws 94, carried upon the reciprocating carriage R, of the rock-shaft 100, having arms 107 109, and the adjustable rod 111, passing through the stationary bearing 112 and having the spring 114, substantially as described.

37. In a lasting-machine, the combination, with the carriages R and the right and left hand screw-shaft for operating them, of the threaded sleeve 117, forming a bearing for the shaft and working in a stationary nut for adjusting the shaft and carriages, substantially as described.

38. In a lasting-machine, the combination of a series of lasting-fingers and a series of clamping-pieces divided from each other and interposed between the shanks of said fingers, a carrier or support for said pieces, along which they are longitudinally movable to grasp the said shanks, and means for forcing said pieces and shanks together to secure the fingers, the said shanks being independently adjustable in and out between the clamping-pieces and oscillatory relative to said support, substantially as described.

In testimony whereof I have hereunto set my hand in the presence of two subscribing witnesses.

JOHN PATTEN.

Witnesses:
J. J. KENNEDY,
GEORGE H. BOTTS.